US012639982B2

(12) United States Patent
Hale et al.

(10) Patent No.: US 12,639,982 B2
(45) Date of Patent: May 26, 2026

(54) PREDICTING A NEED FOR ASSISTANCE BY DETERMINING BEHAVIOR BASED ON MACHINE LEARNING MODEL ANALYSIS OF VIDEO DATA

(71) Applicant: Disney Enterprises, Inc., Burbank, CA (US)

(72) Inventors: Gregory Brooks Hale, Orlando, FL (US); Gary D. Markowitz, San Juan Capistrano, CA (US); Clifford Aron Wilkinson, Clermont, FL (US); Ching-Chien Chen, Arcadia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 102 days.

(21) Appl. No.: 18/465,153

(22) Filed: Sep. 11, 2023

(65) Prior Publication Data

US 2023/0419729 A1    Dec. 28, 2023

Related U.S. Application Data

(63) Continuation-in-part of application No. 17/901,687, filed on Sep. 1, 2022, which is a continuation of
(Continued)

(51) Int. Cl.
*G06V 40/20* (2022.01)
*G06V 20/40* (2022.01)
(Continued)

(52) U.S. Cl.
CPC .............. *G06V 40/20* (2022.01); *G06V 20/41* (2022.01); *G06V 40/10* (2022.01); *G06V 40/1365* (2022.01); *G09B 19/003* (2013.01)

(58) Field of Classification Search
CPC .... G06V 40/20; G06V 40/1365; G06V 40/10; G09B 19/003
See application file for complete search history.

(56) References Cited

U.S. PATENT DOCUMENTS

| | | | |
|---|---|---|---|
| 6,133,838 | A | 10/2000 | Meniere |
| 10,086,262 | B1 | 10/2018 | Capper et al. |

(Continued)

FOREIGN PATENT DOCUMENTS

| | | |
|---|---|---|
| CN | 110210323 A | 9/2019 |
| KR | 20240071833 A | 5/2024 |

(Continued)

OTHER PUBLICATIONS

Hoshen, et al., "Egocentric Video Biometrics," retrieved from https://arxiv.org/abs/1411.7591v1, 9 pages (2014).
(Continued)

*Primary Examiner* — Girumsew Wendmagegn
(74) *Attorney, Agent, or Firm* — Foley & Lardner LLP

(57) ABSTRACT

A behavior detection platform may obtain video data of an environment including a guest and may determine a set of normal guest behaviors associated with the environment. The platform may analyze, using a first machine learning model, the video data to identify features of the guest and analyze, using a second machine learning model, the video data and the features to determine an actual guest behavior of the guest. The platform may predict, using the second machine learning model, a predicted guest behavior of the guest based on the actual guest behavior. The behavior detection platform may determine that at least one of the actual guest behavior or the predicted guest behavior is not included in the set of normal guest behaviors. The platform may cause assistance to be provided to the guest based on
(Continued)

determining that the actual guest behavior or the predicted guest behavior are not included.

17 Claims, 7 Drawing Sheets

Related U.S. Application Data application No. 16/531,930, filed on Aug. 5, 2019, now Pat. No. 11,450,145, which is a continuation-in-part of application No. 15/485,896, filed on Apr. 12, 2017, now Pat. No. 10,417,896.

(60) Provisional application No. 63/511,177, filed on Jun. 29, 2023.

(51) Int. Cl.
G06V 40/10 (2022.01)
G06V 40/12 (2022.01)
G09B 19/00 (2006.01)

(56) References Cited

U.S. PATENT DOCUMENTS

| | | | |
|---|---|---|---|
| 2010/0210975 | A1 | 8/2010 | Anthony et al. |
| 2011/0098109 | A1 | 4/2011 | Leake et al. |
| 2014/0327548 | A1 | 11/2014 | Maisonnier et al. |
| 2015/0213244 | A1 | 7/2015 | Lymberopoulos et al. |
| 2017/0278051 | A1 | 9/2017 | Cohn |
| 2018/0040223 | A1 | 2/2018 | Bodi |
| 2021/0194718 | A1 | 6/2021 | Scalisi |
| 2021/0241597 | A1 | 8/2021 | Gali et al. |
| 2022/0343650 | A1 | 10/2022 | Konakalla et al. |
| 2023/0394355 | A1 | 12/2023 | Bruce et al. |
| 2024/0378893 | A1* | 11/2024 | Han .................... G06V 10/764 |

FOREIGN PATENT DOCUMENTS

| | | |
|---|---|---|
| WO | WO-02/097758 A1 | 12/2002 |
| WO | WO-2012/145800 A1 | 11/2012 |
| WO | WO-2017/130187 A1 | 8/2017 |

OTHER PUBLICATIONS

Kearns, et al., "Temporo-spacial prompting for persons with cognitive impairment using smart wrist-worn interface," Journal of Rehabilitation Research and Development 50(10), pp. vii-xiii (2013).

* cited by examiner

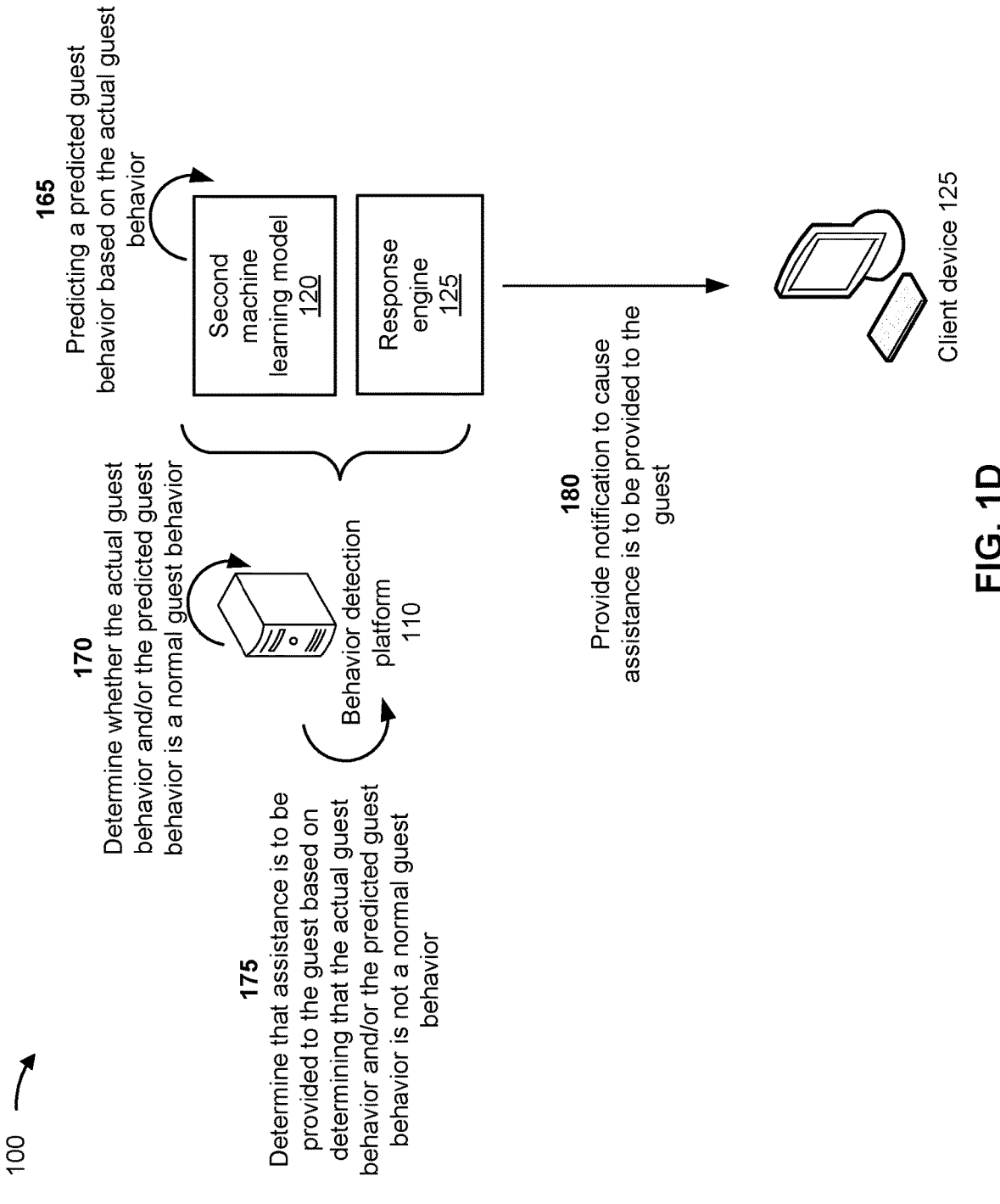

165
Predicting a predicted guest behavior based on the actual guest behavior Second machine learning model 120

Response engine 125

170
Determine whether the actual guest behavior and/or the predicted guest behavior is a normal guest behavior Behavior detection platform 110

175
Determine that assistance is to be provided to the guest based on determining that the actual guest behavior and/or the predicted guest behavior is not a normal guest behavior

180
Provide notification to cause assistance is to be provided to the guest

Client device 125

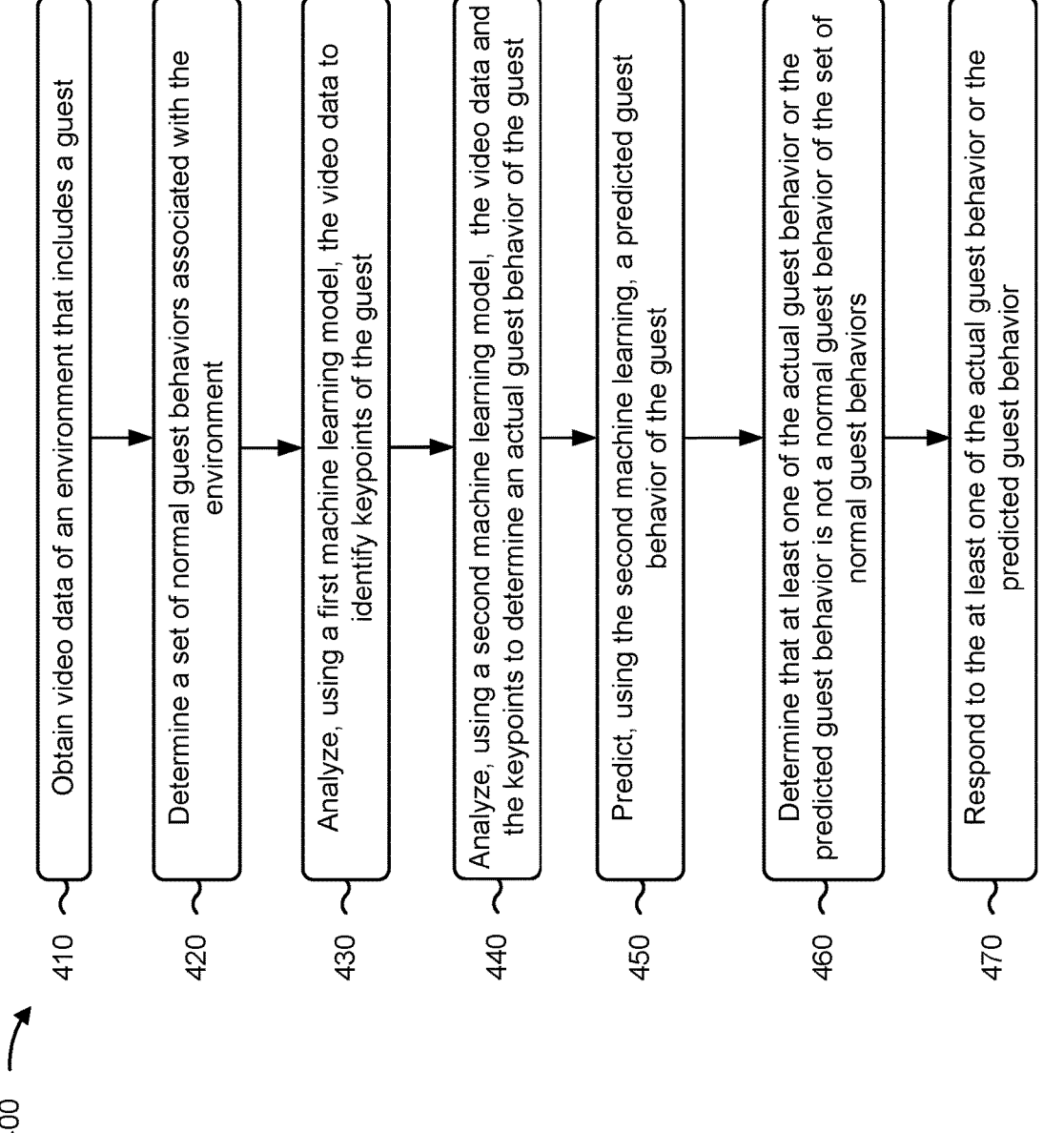

410 Obtain video data of an environment that includes a guest

420 Determine a set of normal guest behaviors associated with the environment

430 Analyze, using a first machine learning model, the video data to identify keypoints of the guest 440 Analyze, using a second machine learning model, the video data and the keypoints to determine an actual guest behavior of the guest 450 Predict, using the second machine learning, a predicted guest behavior of the guest 460 Determine that at least one of the actual guest behavior or the predicted guest behavior is not a normal guest behavior of the set of normal guest behaviors 470 Respond to the at least one of the actual guest behavior or the predicted guest behavior

PREDICTING A NEED FOR ASSISTANCE BY DETERMINING BEHAVIOR BASED ON MACHINE LEARNING MODEL ANALYSIS OF VIDEO DATA

RELATED APPLICATION

This application claims priority to U.S. Provisional Patent Application No. 63/511,117, filed Jun. 29, 2023, which is incorporated herein by reference in its entirety. This application is also a continuation-in-part of U.S. patent application Ser. No. 17/901,687, filed Sep. 1, 2022, which is a continuation of U.S. patent application Ser. No. 16/531,930, filed Aug. 5, 2019, now U.S. Pat. No. 11,450,145, which is a continuation-in-part of U.S. patent application Ser. No. 15/485,896, filed Apr. 12, 2017, now U.S. Pat. No. 10,417, 896, which are all incorporated herein by reference in their entireties.

BACKGROUND

Closed-circuit television (CCTV) is a system that includes video camera devices that provide signals (e.g., video feeds) to specified monitors located at a specified location. In this regard, a CCTV system differs from a broadcast television system that broadcasts signals to multiple monitors located at multiple locations. A CCTV system is typically used to perform surveillance of areas monitored by the video camera devices.

SUMMARY

In some implementations, a method performed by a behavior detection platform includes obtaining video data of an environment that includes a guest; determining a set of normal guest behaviors associated with the environment; analyzing the video data, using a first machine learning model, to determine an actual guest behavior of the guest; predicting, using a second machine learning model, a predicted guest behavior of the guest, wherein the predicted guest behavior is predicted based on the actual guest behavior; determining that at least one of the actual guest behavior or the predicted guest behavior is not a normal guest behavior of the set of normal guest behaviors; and responding to the at least one of the actual guest behavior or the predicted guest behavior based on determining that the at least one of the actual guest behavior or the predicted guest behavior is not a normal guest behavior of the set of normal guest behaviors.

In some implementations, a device includes one or more processors configured to: obtain video data of an environment that includes a guest; analyze the video data, using a deep learning model, to determine an actual guest behavior of the guest; determine that the actual guest behavior is an abnormal guest behavior with respect to a set of normal guest behaviors of guests in the environment; determine that assistance is to be provided to the guest based on determining that the actual guest behavior is an abnormal guest behavior; and provide a notification indicating that assistance is to be provided to the guest based on determining that assistance is to be provided to the guest.

In some implementations, a non-transitory computer-readable medium storing a set of instructions includes one or more instructions that, when executed by one or more processors of a device, cause the device to: obtain video data of an environment that includes a guest; analyze the video data using one or more object recognition techniques; determine an actual guest behavior of the guest based on analyzing the video data using the one or more object recognition techniques; determine that the actual guest behavior is not part of a set of normal guest behaviors of guests in the environment; determine that assistance is to be provided to the guest based on determining that the actual guest behavior is not part of the set of normal guest behaviors; and cause an action to be performed to provide assistance to the guest.

BRIEF DESCRIPTION OF THE DRAWINGS

FIGS. 1A-1D are diagrams of an example implementation described herein.

FIG. 4 is a flowchart of an example process relating to determining whether assistance is to be provided to a guest based on machine learning analysis of video data.

DETAILED DESCRIPTION

Figure 1A:
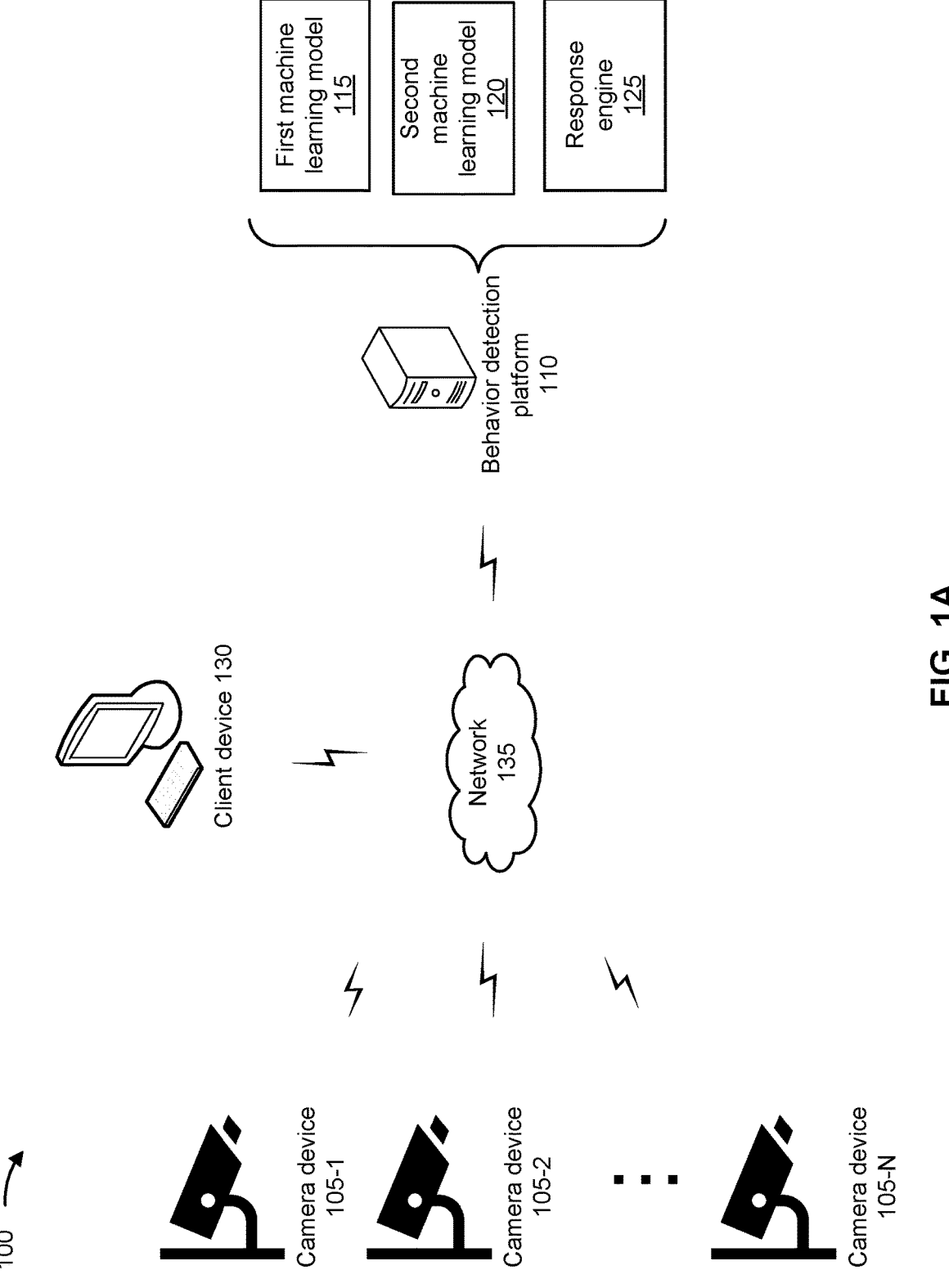

The following detailed description of example implementations refers to the accompanying drawings. The same reference numbers in different drawings may identify the same or similar elements.

A CCTV system may be used to perform surveillance of areas monitored by video camera devices. The video camera devices may provide signals (e.g., video feed) to video monitors operated by an operator. The operator may monitor the video monitors to be apprised of events occurring in areas captured by the video camera devices and to determine whether assistance is to be provided to individuals in the areas.

Currently, it is challenging to simultaneously and constantly monitor the video feeds displayed by the video monitors. Typically, the operator may monitor the video feed of a first video monitor for a period of time and then monitor the video feed of a second video monitor for another period of time. While operators are quite skilled at this task, there is so much information provided in a video feed that it remains possible that some information may not be noticed or that more information may be gleaned from the video feeds than is possible with current methods.

For example, the operator may miss an event displayed on a first video monitor when the operator is attending to a second video monitor (and vice versa). For example, the event may indicate that a person needs assistance and the operator may be delayed in providing the desired assistance.

Accordingly, a need exists to improve existing CCTV systems (and/or similar video-based monitoring systems) to enable the operator to better provide assistance or other response based on information in the video. Furthermore, existing CCTV systems include multiple devices that constantly consume computing resources (e.g., for processing the video feeds), network resources (e.g., for transmitting the video feeds), and data storage resources (e.g., for storing the video feeds). Accordingly, existing CCTV systems unnecessarily consume computing resources, network resources, and data storage resources when one or more video monitors are not being utilized by the operator because the operator is monitoring another video monitor.

Implementations described herein are directed to analyzing video data to determine a guest behavior of a guest and determine whether assistance or other response is to be provided to the guest based on the guest behavior. For example, implementations described herein use video and/or audio analytics to detect behaviors of a guest in distress and/or to detect behaviors of guests assisting the guest in distress. The video and/or audio analytics may be analyzed using one or more machine learning models.

As used herein, "guest behavior" may refer to and/or may be based on a set of movements performed by the guest, a set of actions performed by the guest, among other examples. The term "guest" may be used to refer to a person, a party, a patron, a passenger, among other examples.

In some examples, a behavior detection platform may receive video data of an environment that includes a guest. The video data may be received from a camera device. The environment may include a venue, an establishment, a roadway (e.g., a passage for vehicles and/or pedestrians to travel), a motor vehicle, among other examples. In this regard, the guest may be located at the venue, located at the establishment, located at near the roadway, or located inside the motor vehicle.

In some situations, the behavior detection platform may determine a set of normal guest behaviors associated with the environment. For example, the behavior detection platform may determine a set of normal guest behaviors of guests located at the venue, located at the establishment, located at near the roadway, or located inside the motor vehicle. A "normal guest behavior," as used herein, may refer to a guest behavior that is typical (e.g., a guest behavior that typically occurs in the environment or that is expected in the environment). Conversely, an "abnormal guest behavior," as used herein, may refer to a guest behavior that is not typical (e.g., a guest behavior that is not typical in the environment." For example, raising one's arms in an expression of joy and excitement may be normal behavior in a particular environment whereas waving quickly and dramatically to draw attention may be abnormal behavior. In some implementations, the normal guest behavior may be based on one or more rules for each environment. In this regard, one rule may indicate that raising one's arms in an expression of joy and excitement is a guest behavior that is part of the set of normal guest behavior associated with the environment.

In some implementations, a human trainer may classify certain guest behaviors and predicted guest behaviors as normal guest behaviors for a given environment. Additionally, or alternatively, normal guest behaviors may be classified using logic that applies rules generated by the human trainer.

The behavior detection platform may analyze the video data, using one or more machine learning models, to determine a guest behavior of the guest. For example, the behavior detection platform may analyze the video data using one or more object recognition algorithms.

In some examples, the behavior detection platform may use a keypoint detection technique, a pose estimation technique, and/or an action recognition technique to determine and classify an actual guest behavior of the guest. In the example above, the behavior detection platform is trained and/or learns to distinguish between normal raised hands to express excitement and abnormal waving to draw attention.

In some situations, the behavior detection platform may predict a predicted guest behavior of the guest based on the actual guest behavior. Additionally, or alternatively, the behavior detection platform may predict the predicted guest behavior of the guest based on the environment (e.g., based on one or more objects in the environment). In other words, the behavior detection platform may predict the guest behavior that the guest will engage in based on the actual guest behavior (detected by the behavior detection platform) and/or the environment. For example, a guest suddenly changing their gaze direction to the ground may predict that the guest will in the future attempt to move or reach to retrieve a dropped item.

The behavior detection platform may predict the predicted guest behavior using a machine learning model trained to predict a guest behavior based on actual guest behaviors and/or based on objects in an environment. In some examples, the machine learning model may determine an intent of the guest based on the actual guest behavior and/or the environment. The machine learning model may predict the predicted guest behavior based on the intent.

The behavior detection platform may determine whether the actual guest behavior and/or the predicted guest behavior is part of the set of normal guest behaviors. In some situations, the behavior detection platform may compare the actual guest behavior and a model trained using data regarding the set of normal guest behaviors and/or compare the predicted guest behavior and the model. If the behavior detection platform determines that the actual guest behavior and/or the predicted guest behavior is not part of the set of normal guest behaviors guest, the behavior detection platform may determine that assistance is to be provided to the guest.

As an example, based on analyzing the video data using software that performs biomechanical analysis, skeleton tracking or the like, the behavior detection platform may determine that a guest, in an unmanned motor vehicle, is crossing their arms back and forth while looking at a camera device located within a threshold distance of the unmanned motor vehicle. The behavior detection platform may determine that guests, in the unmanned motor vehicle, do not typically cross their arms back and forth while looking at a camera device (i.e., crossed arms is classified as abnormal behavior). Accordingly, the behavior detection platform may determine that assistance is to be provided to the guest.

As another example, based on analyzing the video data using biomechanical analysis software, gaze direction analysis software and the like, the behavior detection platform may detect that a guest is looking for an exit while being transported in a motor vehicle. This analysis may be aided by providing the behavior detection platform information about the environment such as the location of exits and location of the motor vehicle. The behavior detection platform may predict that the guest will attempt to exit the motor vehicle while the motor vehicle is in operation. Based on determining that the guest is looking for an exit and/or based on predicting that the guest will attempt to exit the motor vehicle, the behavior detection platform may determine that assistance is to be provided to the guest.

As yet another example, based on analyzing the video data using, for example, biomechanical or skeletal analysis software suitable for multiple people, the behavior detection platform may determine that a first guest is assisting a second guest in distress. Accordingly, the behavior detection platform may determine that assistance is to be provided to the second guest.

As yet another example, based on analyzing the video data using, for example, motion analysis software that considers movement over multiple frames or a span of time in the video, the behavior detection platform may determine that a guest (located at an establishment) has been pacing up and down a same pathway (e.g., a same aisle) for an amount of time that exceeds a time threshold. The behavior detection platform may determine that guests, at the establishment, do not typically pace up and down an aisle for an amount of time that exceeds a time threshold and classify the behavior as abnormal.

Based on determining that assistance is to be provided to the guest, the behavior detection system may cause assistance to be provided to the guest in real-time or near real-time. For example, the behavior detection system may provide a notification to a device of the operator of the motor vehicle, to a device of the operator of the motor vehicle, to a device of a worker at the establishment, to a public address system at the establishment, among other examples. The notification may include information indicating that assistance is to be provided to the guest. Alternatively or in addition, the behavior detection system may autonomously issue commands to alter the motion of the motor vehicle to slow, change direction or stop it altogether. Therefore, implementations described herein enable assistance to be provided to the guest in a timely manner.

In this regard, the behavior detection platform may use information regarding a pose of the guest, information regarding an orientation of the guest, and/or behavioral analysis to determine that assistance is to be provided to the guest. Additionally, or alternatively, the behavior detection platform may use audio data to determine that assistance is to be provided to the guest. In some situations, the audio data may be used to confirm the analysis of the video data. For example, the behavior detection platform may detect keywords that indicate that assistance is to be provided to the guest. Additionally, or alternatively, the behavior detection platform may analyze the audio data to detect an emotion of the guest. For example, the behavior detection platform may detect that the guest is under stress while verbalizing a need for assistance.

Instead of relying on an operator to monitor (continuously and simultaneously) the video monitors of a CCTV system, implementations described herein may use behavioral algorithms (of one or more machine learning models) to determine assistance is to be provided to a guest. Accordingly, implementations described herein improve existing CCTV systems by detecting the guest behavior of a guest needing assistance independently of detection by an operator monitoring a video monitor. Additionally, by detecting the guest behaviors in this manner, implementations described herein may prevent a video monitor (that is monitored by the operator) from unnecessarily consuming computing resources, network resources, and/or storage resources.

For example, the video monitor may be placed in an idle mode when the video monitor is not monitored by the operator and may be placed in an active mode to notify the operator that assistance is to be provided to the guest. In some implementations, the multiple video monitors of existing CCTV systems may be reduced to a single device of the operator. The device may receive the notification from the behavior detection system after the behavior detection system determines that assistance is to be provided to the guest.

FIGS. 1A-1D are diagrams of an example implementation 100 associated with determining whether assistance is to be provided to a guest based on machine learning analysis of video data. As shown in FIGS. 1A-1D, example implementation 100 includes camera devices 105-1, camera device 105-2, to camera device 105-N (collectively camera devices 105 and individual camera device 105), behavior detection platform 110, and client device 130.

The devices may be connected via a network 135 that includes one or more wired and/or wireless networks. For example, network 135 may include Ethernet switches. Additionally, or alternatively, network 135 may include a cellular network, a public land mobile network (PLMN), a local area network (LAN), a wide area network (WAN), a private network, the Internet, and/or a combination of these or other types of networks. Network 135 enables communication between camera devices 105, behavior detection platform 110, and/or client device 130.

A camera device 105 may include one or more devices configured to capture video data of an environment. The camera device 105 may provide the video data to behavior detection platform 110. In some situations, the camera device 105 may include a microphone configured to capture audio data simultaneously with the video data being captured. In this regard, the camera device 105 may provide the audio data and/or the video data to behavior detection platform 110. Camera devices 105 are coupled by wired or wireless connections to behavior detection platform 110. Camera devices 105 may provide continuous video/audio streaming or alternatively intermittently stream based on operational needs, triggered programmatically or by motion sensors or other activity triggers.

Behavior detection platform 110 include one or more devices configured to process video data and/or audio data to determine guest behaviors of a guest, to determine (e.g., based on the guest behaviors) whether assistance is to be provided to the guest, and/or to provide assistance to the guest. Processing the video data may include various algorithmic techniques to condition raw video data such that objects and features in the video data are more readily analyzed by later object recognition and machine learning models. This processing may include filtering, adjusting brightness, contrast and color profiles as well as zooming, cropping, rotating and the like. The particular processes chosen and sequence of operations will be adapted to a particular environment and capabilities of camera devices 105. For example, video from a dark environment may benefit from exposure and contrast enhancement, while video of a moving vehicle may benefit from rotational translation. In many examples algorithmic feature detection processes are also executed such as edge enhancement and detection processes, corner detection, blob detection, ridge detection and the like are used to as a part of object detection and scene analysis. Example detection techniques include Canny, Deriche, Sobel, Prewitt and/or Roberts edge detection, LoG, DoG, and DoH blob detection, Harris, Shi and Tomasi, level curve curvature corner detection, and Hough transform ridge detection. As shown in FIG. 1A, behavior detection platform 110 may include a first machine learning model 115, a second machine learning model 120, and a response engine 125.

First machine learning model 115 may be a machine learning model trained to determine a guest behavior of a guest. For example, first machine learning model 115 may be trained to detect and/or classify objects within a video image such as body parts of the guest, guest objects belonging to the guest, environment objects in an environment, among other examples. First machine learning model 115 may use raw or partially processed video or video frames as input, or may use features (edges, corners, blobs, ridges, and the like) that were identified previously. The body parts may include a head, a neck, shoulders, elbows, wrists, hips, knees, among other examples. The guest objects may include a phone, a camera, a purse, among other examples. The environment may include objects may include signs, doors, among other examples. First machine learning model 115 preferably takes context into account in its training and operation such that it is specifically trained to distinguish between normal and abnormal objects and guest behavior presented in its input.

In some implementations, first machine learning model 115 may implement one or more object recognition techniques. For example, first machine learning model 115 may detect and/or classify features within the video image, such as body parts of the guest. For instance, first machine learning model 115 may implement a keypoint detection technique and/or a pose estimation technique, among other examples. Additionally, or alternatively, first machine learning model 115 may implement a convolutional neural network (CNN), a Single Shot MultiBox Detector (SSD) technique, and/or a You Only Look Once (YOLO) technique, among other examples. In this regard, first machine learning model 115 may be configured to determine (as the keypoints) the body parts mentioned herein. The keypoints may be example features that may be detected by first machine learning model 115. Other features may include corners, ridges, blobs, and/or edges, among other examples. In some situations, first machine learning model 115 may be a deep learning model.

Second machine learning model 120 may be a machine learning model trained to determine an actual guest behavior of the guest based on an output of the one or more object recognition techniques. For example, second machine learning model 120 may determine an actual guest behavior of the guest based on a result of processing one or more image frames using the one or more object recognition techniques. In this regard, second machine learning model 120 may be a true action recognition model. For example, second machine learning model 120 may implement an action recognition technique.

Additionally, or alternatively, machine learning model 120 may be a machine learning model trained to predict a predicted guest behavior of the guest. For example, second machine learning model 120 may predict the predicted guest behavior based on the actual guest behavior. Additionally, or alternatively, second machine learning model 120 may predict the predicted guest behavior based on the environment in the video data (e.g., based on one or more objects identified in the video data). For instance, second machine learning model 120 may be trained to determine an intent of the guest based on the actual guest behavior and/or based on the environment. Based on the intent of the guest, second machine learning model 120 may predict the predicted guest behavior.

Second machine learning model 120 may be trained using training data that includes historical video data regarding historical guest behaviors of guests at the environment. In some examples, the historical guest behaviors may include a first set of guest behaviors performed during a first period of time and a second set of guest behaviors performed during a second period of time that consecutively follows the first period of time. Accordingly, second machine learning model 120 may be trained to predict the second set of guest behaviors based on the first set of guest behaviors.

In some examples, the historical guest behaviors may include one or more objects identified during a first period of time and a set of guest behaviors performed during a second period of time that consecutively follows the first period of time. Accordingly, second machine learning model 120 may predict the set of guest behaviors based on the one or more objects.

In some examples, behavior detection platform 110 may train first machine learning model 115 and/or second machine learning model 120. Additionally, or alternatively, a different device may generate and train first machine learning model 115 and/or second machine learning model 120.

In some implementations, behavior detection platform 110 may utilize rules and logic to determine whether a guest behavior (actual or predicted) is a normal behavior for a particular environment or an abnormal behavior for the particular environment. For example, one rule may indicate that the guest seeking an item during a first period of time is a normal guest behavior in the particular environment. Another rule may indicate that the guest seeking an item during a second period of time (that exceeds the first period of time) is an abnormal guest behavior in the particular environment.

Response engine 125 may include one or more devices configured to provide recommendations and/or perform an action based on whether a guest behavior is a normal guest behavior or an abnormal guest behavior. In some implementations, response engine 125 may include the rules and logic to determine whether the guest behavior (actual or predicted) is a normal behavior or an abnormal behavior.

Client device 130 may include one or more devices configured to receive notifications from behavior detection platform 110 and cause assistance to be provided to the guest. In some examples, client device 130 may be a device of an operator at a venue, a worker at an establishment, an operator of a motor vehicle, among other examples. The notifications may cause client device 130 to control an operation of a device at the venue, an operation of a device at the establishment, and/or an operation of the motor vehicle, to provide assistance to the guest.

Figure 1B:
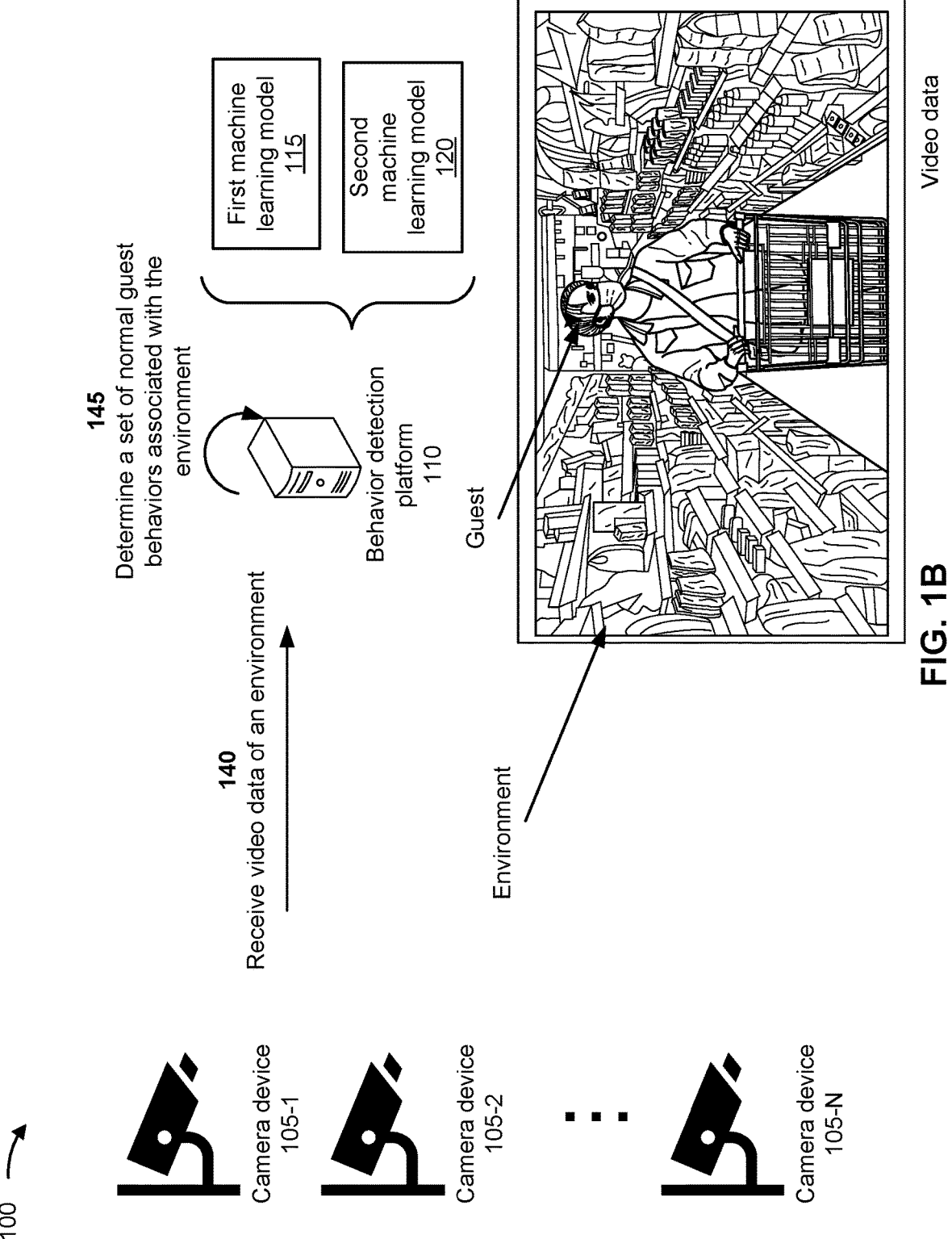

As shown in FIG. 1B, and by reference number 140, behavior detection platform 110 may receive video data of an environment. For example, behavior detection platform 110 may receive the video data from a camera device 105 (e.g., camera device 105-1). In some examples, behavior detection platform 110 may receive the video data as a continuous video feed. Additionally, or alternatively, behavior detection platform 110 may receive the video data periodically (e.g., every second, every ten seconds, every thirty seconds, among other examples). Additionally, or alternatively, behavior detection platform 110 may receive the video data based on a trigger (e.g., based on a request provided by behavior detection platform 110 to camera device 105-1 or based upon a sensor indicating proximity of a guest or other environmental condition that warrants collecting video data).

As shown in FIG. 1B, the environment may include an establishment (e.g., a store) and the guest may be located in a pathway of the store (e.g., an aisle of the store). In this example, the guest may be pushing a shopping cart along the pathway. In some situations, behavior detection platform 110 may receive the video data from one or more additional camera devices 105 located at the establishment. Additionally, or alternatively to receiving the video data, behavior detection platform 110 may receive audio data associated with the video data. Behavior detection platform 110 may receive the audio data via a microphone integrated with camera device 105-1. Additionally, or alternatively, behavior detection platform 110 may receive the audio data via a microphone provided at the establishment separate from camera device 105-1.

As shown in FIG. 1B, and by reference number 145, behavior detection platform 110 may determine a set of normal guest behaviors associated with the environment. For example, based on receiving the video data of the environment, behavior detection platform 110 may determine the set of normal guest behaviors associated with the environment. In some implementations, behavior detection platform 110 may determine the set of normal guest behaviors based on information regarding camera device 105-1. In some examples, behavior detection platform 110 may receive the information regarding camera device 105-1 along with the video data. Additionally, or alternatively, behavior detection platform 110 may receive the information regarding camera device 105-1 independently of receiving the video data.

Based on the information regarding camera device 105-1, behavior detection platform 110 may determine that camera device 105-1 is a camera device located inside the establishment. The information regarding camera device 105-1 may include information identifying camera device 105-1 and/or information identifying a location of camera device 105-1. The information identifying camera device 105-1 may include a serial number of camera device 105-1, a network address associated with camera device 105-1, among other examples of information that may uniquely identify camera device 105-1. The information identifying the location of camera device 105-1 may include geographic coordinates, a street address, a zip code, among other examples.

In some implementations, behavior detection platform 110 may determine the set of normal guest behaviors based on the environment. In this regard, the set of normal guest behaviors may include one or more guest behaviors that are expected in the environment. For example, behavior detection platform 110 may analyze the video data to identify one or more objects included in the video data. In this example described here, behavior detection platform 110 may identify shelves, items on the shelves, and an aisle. Accordingly, behavior detection platform 110 may determine that the environment includes the establishment and determine that camera device 105-1 is located inside the establishment.

The set of normal guest behaviors may be updated periodically (e.g., every day, every week, every month, continuously or irregularly on a varied schedule among other examples). Additionally, or alternatively, the set of normal guest behaviors may be updated based on a trigger (e.g., based on a request from a device of a worker at the establishment).

In some situations, the set of normal guest behaviors may vary based on various factors. In some situations, the set of normal guest behaviors may vary based on a time of the day, based on a day of week, based on a month of the year, based on a season, and based on events occurring at the establishment among other examples. The season may include the winter season, spring break, a hurricane season, among other examples.

Figure 1C:
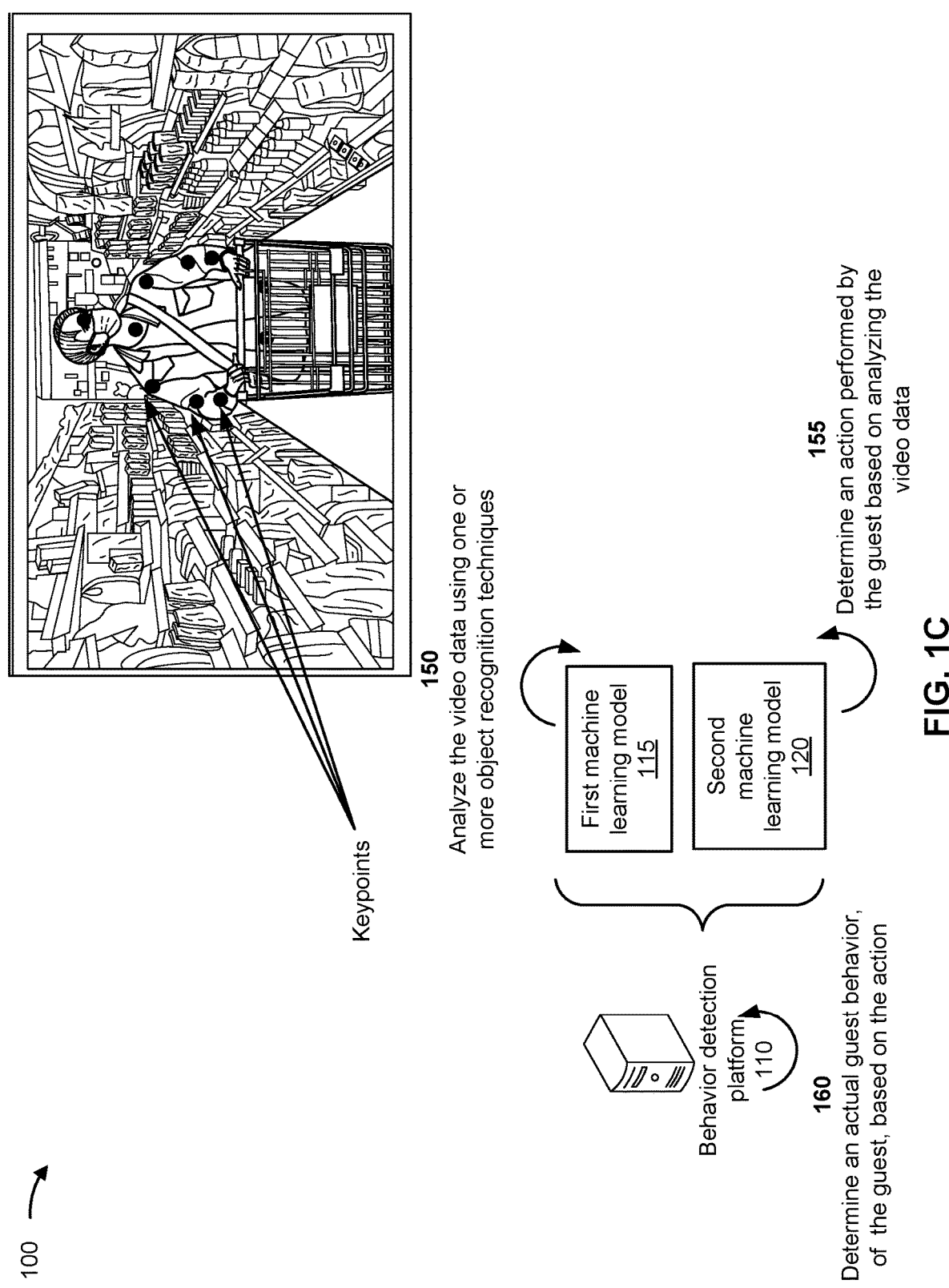

As shown in FIG. 1C, and by reference number 150, behavior detection platform 110 may analyze the video data using one or more object recognition techniques. For example, based on receiving the video data of the environment, behavior detection platform 110 may analyze one or more frames of the video data using first machine learning model 115. For example, first machine learning model 115 may receive the video data as input and may provide, as an output, information identifying keypoints of the guest and/or objects identified in the video data.

In some examples, behavior detection platform 110 may analyze the video data using the keypoint detection technique (of first machine learning model 115) to determine keypoints of the guest. For instance, first machine learning model 115 may analyze individual frames of the video data to detect keypoints (of the guest) in each frame of the video frame. As shown in FIG. 1C, first machine learning model 115 may analyze a particular frame of the video data to determine (as the keypoints) a face of the guest, a neck of the guest, shoulders of the guest, elbows of the guest, wrists of the guest, hips of the guest, and so on.

In some implementations, behavior detection platform 110 may analyze the keypoints using the pose estimation technique (of first machine learning model 115). As a result of analyzing the keypoints using the pose estimation technique, behavior detection platform 110 may determine a pose and/or an orientation of the guest. Behavior detection platform 110 (e.g., using second machine learning model 120) may determine an action performed by the guest based on the pose and/or the orientation of the guest. In some situations, behavior detection platform 110 may analyze the pose and/or the orientation, using the action recognition technique (of second machine learning model 120), to determine the action.

As shown in FIG. 1C, and by reference number 155, behavior detection platform 110 may determine an action performed by the guest based on analyzing the video data using the one or more object recognition techniques. For example, behavior detection platform 110 may determine the action using the action recognition technique implemented by second machine learning model 120. For instance, behavior detection platform 110 may determine the action based on the keypoints (of the guest) over a plurality of frames of the video data. For instance, behavior detection platform 110 may analyze the keypoints, using the action recognition technique, to determine the action.

Additionally, or alternatively, behavior detection platform 110 may analyze the pose and/or the orientation over multiple frames of the video data, using the action recognition technique, to determine the action. In some examples, the action may include the guest walking down the pathway, walking up and down the pathway, searching for an item, looking at signs in the aisle and/or within a distance threshold of the aisle, waving at camera device 105-1 and/or at another camera device 105, providing assistance to another guest (e.g., to direct the other guest to another aisle), among other examples.

For example, behavior detection platform 110 (e.g., using second machine learning model 120) may determine that the guest is walking. Based on previously determining that camera device 105-1 is located in the establishment, behavior detection platform 110 may determine that the guest is walking in the establishment and, accordingly, determine that the guest is shopping at the establishment. In some situations, behavior detection platform 110 may determine that the guest is pacing up and down an aisle at the establishment.

In some situations, behavior detection platform 110 may determine that the guest is looking at an item in the aisle (e.g., while walking down the aisle or while stationary). For example, behavior detection platform 110 may determine a direction of a gaze of the guest. Based on the direction of the gaze of the guest and a period of time the gaze of the guest remains in the direction, behavior detection platform 110 may determine that the guest is looking for an item. The guest's actual behavior can be thought of an understanding of the determined action in context of the environment. In FIG. 1C, a guest with a gaze directed to the left (i.e., the action) at surrounding shelves (i.e., the context) may be determined to be seeking a particular item, a normal behavior in a shopping aisle. In another context, such as if the guest is near an exit door, the gaze directed to left may indicate a new behavior such as the guest is seeking to exit the establishment or has detected someone trying to enter the establishment through the door, both abnormal behaviors. The particular context can be determined from scene analysis, or often more readily by knowing information regarding the camera device 105 such as camera location. In this manner, behavior detection platform 110 operates to derive meaning from guest actions to reveal guest behavior.

As shown in FIG. 1C, and by reference number 160, behavior detection platform 110 may determine an actual guest behavior of the guest based on the action. For example, behavior detection platform 110 may determine the actual guest behavior as the action determined above.

As shown in FIG. 1D, and by reference number 165, behavior detection platform 110 may predict a predicted guest behavior. For example, after determining the actual guest behavior, behavior detection platform 110 may predict a predicted guest behavior based on the actual guest behavior. Additionally, or alternatively, behavior detection platform 110 may predict the predicted guest behavior based on one or more objects in the environment. Behavior detection platform 110 may predict the predicted guest behavior using second machine learning model 120. For example, second machine learning model 120 (or a third machine learning model) may receive the video data and information regarding the actual guest behavior as inputs and may provide, as an output, information regarding the predicted guest behavior. Additionally, or alternatively, second machine learning model 120 (or a third machine learning model) may receive information regarding the one or more objects in the environment as an input and may provide, as an output, information regarding the predicted guest behavior.

In some situations, second machine learning model 120 may determine an intent of the guest based on the actual guest behavior and/or one or more frames of the video data that precede a current frame of the video data. Based on the intent of the guest, second machine learning model 120 may predict the predicted guest behavior. As an example, if second machine learning model 120 detects that the guest is walking up and down the same aisle for a period of time that exceed a time threshold, second machine learning model 120 may determine that the guest is looking for, but cannot find, a particular item.

Second machine learning model 120 may predict (based on the detected actual guest behavior) that the guest will leave the aisle after the period of time has expired. Additionally, or alternatively, second machine learning model 120 may predict (based on the detected actual guest behavior) that the guest will seek assistance from a worker at the establishment. Additionally, or alternatively, second machine learning model 120 may predict (based on the detected actual guest behavior) that the guest will leave the establishment if assistance is not provided in a timely manner.

As another example, if first machine learning model 115 detects an object in the pathway and if first machine learning model 115 detects that the gaze of the guest is not in the direction of the object and/or detects that the velocity of the guest is not decreasing, second machine learning model 120 may determine that the guest will continue to walk down the pathway. Second machine learning model 120 may predict that the guest will collide with the object in the pathway (based on the detected actual guest behavior, based on the gaze direction of the guest, and/or based on detecting that a velocity of the guest is not decreasing).

As yet another example, if second machine learning model 120 detects that the guest is crossing their arms back and forth while looking at camera device 105-1, second machine learning model 120 may determine that the guest is waiving at camera device 105-1 to request assistance (e.g., determine that the intent of the guest is to obtain assistance). Second machine learning model 120 may predict that the guest will leave the aisle. Additionally, or alternatively, second machine learning model 120 may predict that the guest will seek assistance from a worker at the establishment. Additionally, or alternatively, second machine learning model 120 may predict that the guest will leave the establishment if assistance is not provided in a timely manner.

In some implementations, behavior detection platform 110 may predict a predicted human behavior of the guest based on the audio data obtained by behavior detection platform 110. For example, behavior detection platform 110 may process the audio data using one or more audio signal processing techniques. Based on processing the audio data, behavior detection platform 110 may detect keywords or phrases uttered by the guest. For example, behavior detection platform 110 may detect that the guest uttered "I need help," "I can't seem to find this item," "I should check in a different location." Based on the keywords or phrases, behavior detection platform 110 may predict the predicted guest behavior. For example, behavior detection platform 110 may predict that the guest will relocate to a different pathway of the establishment. Additionally, or alternatively, behavior detection platform 110 may predict that the guest will seek assistance from a worker at the establishment. Additionally, or alternatively, behavior detection platform 110 may predict that the guest will leave the establishment.

Additionally, or alternatively, behavior detection platform 110 may analyze the audio data to detect an emotion of the guest. For example, behavior detection platform 110 may determine a pitch of a voice of the guest, a tone of the voice, among other examples of characteristics of the voice. Based on the characteristics of the voice, behavior detection platform 110 may determine the emotion of the guest. Behavior detection platform 110 may detect that the guest is under stress while verbalizing a need assistance.

In some situations, behavior detection platform 110 may predict a predicted human behavior of the guest based on an occurrence of an unexpected event. An "unexpected event" may refer to an event that typically does not occur in the environment. For example, the unexpected event may be the guest unintentionally dropping an object (e.g., a phone, a wallet, a camera, or an item from a shelf, among other examples). Behavior detection platform 110 may detect the occurrence of the unexpected event by analyzing the video data using one or more of the object recognition techniques discussed herein. Based on detecting the occurrence of the unexpected event, behavior detection platform 110 may predict the predicted guest behavior of the guest. For example, behavior detection platform 110 may predict that the guest will pick up the object that has been dropped based on a pose and/or an orientation of the guest after the unexpected event.

As shown in FIG. 1D, and by reference number 170, behavior detection platform 110 may determine whether the actual guest behavior and/or the predicted guest behavior is a normal guest behavior. In some implementations, behavior detection platform 110 may use a machine learning model that has been trained to classify whether a guest behavior is a normal or abnormal guest behavior. For example, the machine learning model may be trained using information regarding a set of normal guest behaviors associated with each environment of a plurality of environments.

Behavior detection platform 110 may provide information regarding the actual guest behavior, information regarding the predicted guest behavior, and/or information regarding the environment as inputs to the machine learning model. The machine learning model may provide, as an output, information indicating whether the actual guest behavior is a normal guest behavior and/or the predicted guest behavior is a normal guest behavior.

As an example, behavior detection platform 110 may classify that walking up and down the pathway for the period of time is not a normal guest behavior at the establishment. In other words, walking up and down the pathway for the period of time is an abnormal guest behavior at the establishment. As another example, behavior detection platform 110 may classify that walking down the pathway without paying attention to objects along the pathway is not a normal guest behavior at the establishment. In other words, walking down the pathway without paying attention to objects along the pathway is an abnormal guest behavior at the establishment. As yet another example, behavior detection platform 110 may classify that waving at a camera device is not a normal guest behavior at the establishment.

While the example herein is described with respect to the guest in the establishment, implementations described herein are applicable to the guest engaging in other activities at different locations. For example, camera device 105-1 may be located at the venue. The video data may indicate that the guest is being transported by a motor vehicle. Based on analyzing the video data as explained above, first machine learning model 115 may detect that a direction, of the gaze of the guest, is directed toward the location of a known exit or the location of a known door. Accordingly, first machine learning model 115 may determine that the guest is looking at or for the exit or the door. In other words, the guest may be seeking the exit or the door. Based on first machine learning model 115 determining that the guest is looking at the exit sign or the door, second machine learning model 120 may determine that the intent of the guest is to exit the motor vehicle. Accordingly, second machine learning model 120 may predict that the guest will imminently attempt to exit the motor vehicle. Behavior detection platform 110 may classify that looking at the exit sign and waving hands in this manner is not a normal guest behavior at this location in the venue.

Continuing with the example of the guest at the venue, based on analyzing the video data, first machine learning model 115 may detect that the guest is providing assistance or is attempting to provide assistance to an additional guest. For example, first machine learning model 115 may detect that the guest is providing assistance or is attempting to provide assistance to the additional guest based on the pose and/or the orientation of the guest, the pose and/or the orientation of the additional guest, a proximity between the guest and the additional guest. For example, first machine learning model 115 may detect that the guest is leaning towards the additional guest and that the guest is interacting with the additional guest. The guest may be interacting with the additional guest during a demonstration (live or recorded) of operating seat restraint elements. For instance, the guest may be attempting to operate a seat restraint of the additional guest. Accordingly, first machine learning model 115 may determine that the intent of the guest is for assistance to be provided to the additional guest. Behavior detection platform 110 may classify that the guest interacting with the additional guest is not a normal guest behavior at this location of the establishment.

As another example, camera device 105-1 may be located with a threshold distance of a roadway. The video data may indicate that the guest is walking or running and is approaching the roadway. Based on analyzing the video data as explained above, first machine learning model 115 may detect an object and detect that a direction, of the gaze of the guest, is directed toward the object. The object may be a mobile phone, a ball, a newspaper, among other examples. Accordingly, first machine learning model 115 may determine that the guest is focusing on the object without considering his or her surroundings. Based on first machine learning model 115 determining that the guest is focusing on the object without considering his or her surroundings, second machine learning model 120 may determine that the intent of the guest is to continue to walk onto the roadway. Accordingly, second machine learning model 120 may predict that the guest will imminently walk onto the roadway without considering whether a vehicle is approaching the guest. Behavior detection platform 110 may classify that walking onto the roadway without considering whether a vehicle is approaching the guest is not a normal guest behavior at the roadway.

In some implementations, behavior detection platform 110 may compare the actual guest behavior and the set of normal guest behaviors associated with the environment. Additionally, behavior detection platform 110 may compare the predicted guest behavior and the set of normal guest behaviors associated with the environment.

As shown in FIG. 1D, and by reference number 175, behavior detection platform 110 may determine that assistance is to be provided to the guest based on determining that the actual guest behavior and/or the predicted guest behavior is not a normal guest behavior (for the environment). For example, based on the comparison and/or based on using the machine learning model as described above in connection with reference number 155, behavior detection platform 110 may determine that the actual guest behavior is not a normal guest behavior. Additionally, or alternatively, behavior detection platform 110 may determine that the predicted guest behavior is not a normal guest behavior.

Based on determining that the actual guest behavior is not a normal guest behavior and/or that the predicted guest behavior is not a normal guest behavior, behavior detection platform 110 may determine that assistance is to be provided to the guest. Behavior detection platform 110 may cause assistance to be provided to the guest in real-time or near real-time. The type of assistance and the manner in which it is called for can be escalated based on the actual or predicted guest behavior and the context of the environment known to behavior detection platform 110. For example, a decision tree or cyclic graph decision process can be implemented by behavior detection platform 110 to select appropriate assistance for a given guest behavior in a given context, be it notifying a human assistant, turning on lights, turning off or removing power from a mechanism, or the like.

As shown in FIG. 1D, and by reference number 180, behavior detection platform 110 may provide a notification to cause assistance to be provided to the guest. For example, response engine 125 may determine a recommendation to be provided or an action to be performed based on determining that assistance is to be provided to the guest. For example, behavior detection platform 110 (e.g., response engine 125) may provide the notification to client device 130. Client device 130 may be a device of the worker, a device of an operator at the venue, a device of the guest, among other examples.

Referring back to the example of the establishment, behavior detection platform 110 may cause a notification to be provided to a device of the worker. The notification may indicate that assistance is to be provided to the guest and may include information identifying a location of the guest (e.g., information identifying the aisle in the example above determined from information about the camera 105 that is conveyed to behavior detection platform 110).

Additionally, or alternatively, behavior detection platform 110 (e.g., response engine 125) may cause a notification to be provided to the guest via a public address system. The notification may indicate that the worker has been notified and is on the way to provide assistance to the guest. With respect to the object on the aisle, the notification may advise the guest that the object is on the aisle and that the guest is to proceed with caution to avoid the object.

Referring now to the example of the venue, behavior detection platform 110 (e.g., response engine 125) may cause a notification to be provided to an operator of the motor vehicle. The notification may provide information regarding the predicted guest behavior of the guest. For example, the notification may indicate that the guest will be imminently exiting the motor vehicle. Alternatively, the notification may indicate that the guest will be picking the dropped object. Alternatively, the notification may indicate that the guest is providing assistance to the additional guest.

In this regard, the notification may cause the operator to instruct the guest (e.g., via a public address system or a similar system) to remain seated. Alternatively, the notification may cause the operator to advise the guest (e.g., via a public address system or a similar system) that the additional guest will be receiving assistance. In some situations, the notification may be provided to a device of the guest instead of being provided to the device of the operator and/or being provided via the public address system.

Referring now to the example of the roadway, behavior detection platform 110 (e.g., response engine 125) may cause a notification to be provided to an operator of traffic elements of the roadway. The traffic elements may include traffic lights, traffic signs, road signs, among other examples. The notification may indicate that the guest is approaching the roadway without considering his or her surroundings. The notification may cause the operator to adjust operations of the traffic elements to enable the guest to continue walking without considering his or her surroundings.

Additionally, or alternatively, the notification may cause the operator to advise the guest to consider his or her surroundings while approaching the roadway. In some situations, the operator may advise the guest via a public address system (or similar system) associated with the roadway. In some examples, the notification may be provided to the device of the guest.

Implementations described herein improve existing CCTV systems by detecting the guest behaviors of a guest needing assistance independently of a video monitor being monitored. Additionally, by detecting the guest behaviors in this manner, implementations described herein may prevent a video monitor (that is monitored by the operator) from unnecessarily consuming computing resources, network resources, and/or storage resources. For example, the video monitor may be in an idle mode when the video monitor is not monitored by the operator and may be in an active mode to notify the operator that assistance is to be provided to the guest. In some implementations, the multiple video monitors of existing CCTV systems may be reduced to a single device of the operator. The device may receive the notification from the behavior detection system after the behavior detection system determines that assistance is to be provided to the guest.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
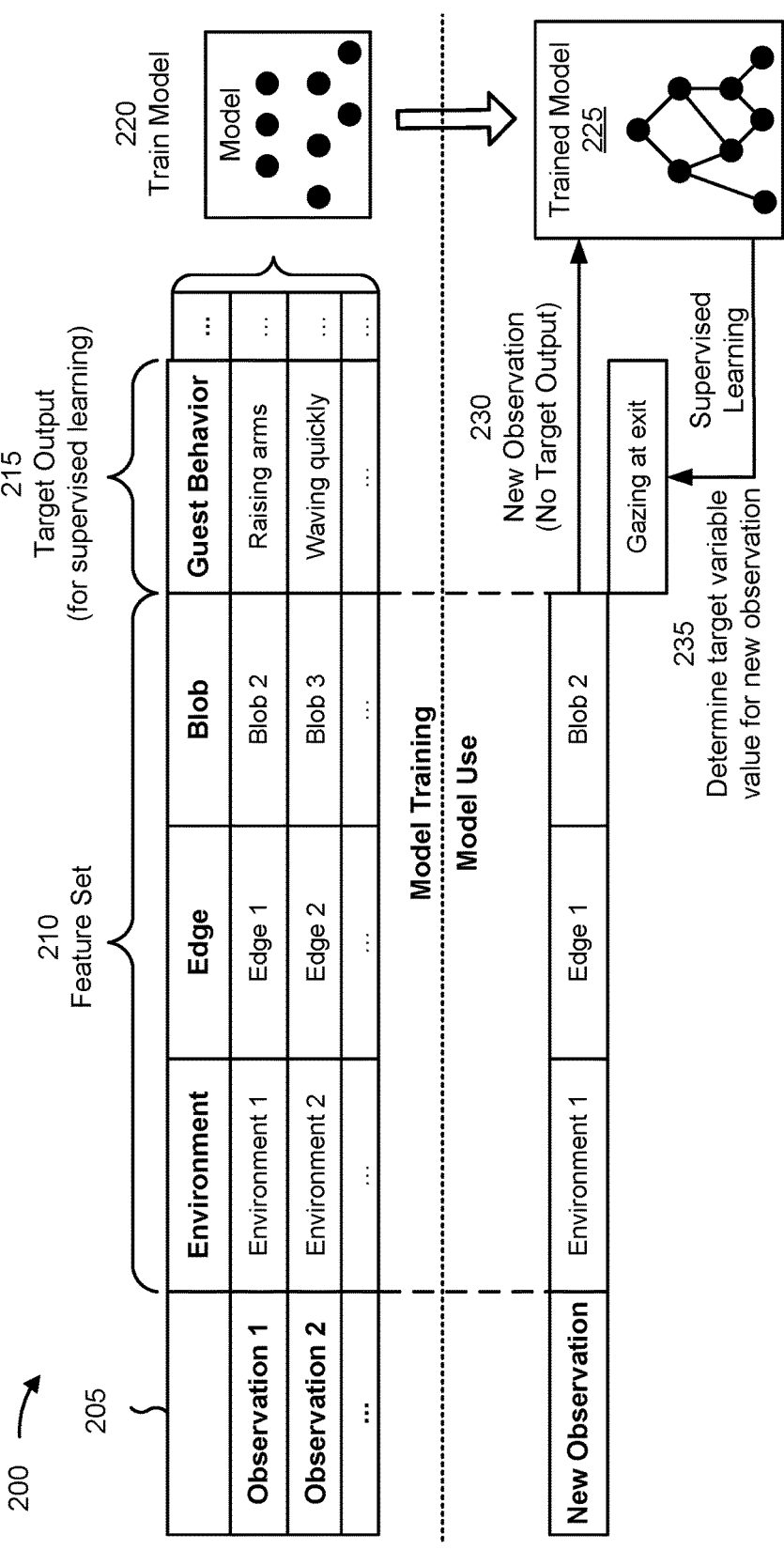
FIG. 2 is a diagram illustrating an example of training and using a machine learning model in connection with determining whether assistance is to be provided to a guest based on machine learning analysis of video data.

FIG. 2 is a diagram illustrating an example 200 of training and using a machine learning model in connection with determining whether assistance is to be provided to a guest based on machine learning analysis of video data. The machine learning model training and usage described herein may be performed using a machine learning system. The machine learning system may include or may be included in a computing device, a server, a cloud computing environment, or the like, such as the camera devices 105, behavior detection platform 110, and/or camera device 105-1.

As shown by reference number 205, a machine learning model may be trained using a set of observations. The set of observations may be obtained from training data (e.g., historical data), such as data gathered during one or more processes. In some implementations, the machine learning system may receive the set of observations (e.g., as input) from camera devices 105.

As shown by reference number 210, the set of observations may include a feature set. The feature set may include a set of values, and a value may be referred to as a feature. A specific observation may include a set of values. In some implementations, the machine learning system may determine values for a set of observations and/or values for a specific observation based on input received from camera devices 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature set of environment, a second feature set of edge, a third feature set of blob, and so on. As shown, for a first observation, the first feature set is labeled Environment 1, the second feature set is labeled Edge 1, the third feature set is labeled Blob 2, and so on. These features sets are provided as examples, and may differ in other examples. Feature set "Environment 1" contains data representing features extracted from Observation 1 that pertain to the physical environment represented in the observation, e.g., walls, aisles, floors, objects and the like that are present in addition to a guest. The Environment 1 feature set will be used as input to an observed scene. Feature set "Edge 1" contains data representing features extracted from Observation 1 that pertain to the edges of body parts of the guest. Feature set "Blob 2" contains data representing features extracted from Observation 1 that pertain to the blobs regarding the body parts of the guest. For example, the feature set may include one or more of the following features: corners, ridges, keypoints, location, time of the day, guest intent, among other examples.

As shown by reference number 215, the set of observations may be associated with a target output. The target output may be represented by a numeric value, may represent a numeric value that falls within a range of values or has some discrete possible values, may represent a value that is selectable from one of multiple options (e.g., one of multiples classes, classifications, or labels) and/or may represent a Boolean value. A target output may be specific to an observation. In example 200, the target output is Guest Behavior, which has a value of "Raising arms" for the first observation. In other words, the first observation may indicate that the guest is raising his or her arms. Accordingly, the machine learning model may be trained, based on the feature set, to classify the observation as an actual guest behavior. Similarly, the machine learning model may be trained, based on the feature set, to classify the observation as a predicted guest behavior. In other words, the target output may be a nuanced classification of the actual guest behavior or the predicted guest behavior.

The target output may represent an output that a machine learning model is being trained to predict, and the feature sets may represent the inputs used to a train a machine learning model. The set of observations may be associated with target output values so that the machine learning model can be trained to recognize patterns in the feature set that lead to a target output. A machine learning model that is trained to predict a target output value may be referred to as a supervised learning model.

In some implementations, the machine learning model may be trained on a set of observations that do not include a target output. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the feature sets 210 extracted from the observations 205 and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, once trained, the machine learning system may apply the trained machine learning model 225 to a new observation, such as by receiving a new observation and inputting the new observation to the trained machine learning model 225. As shown, the new observation may include a first feature set of Environment 1, a second feature set of Edge 1, a third feature set of Blob 2, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target output, such as when supervised learning is employed. Additionally, or alternatively, the output may include information that identifies a cluster to which the new observation belongs (e.g., does the new observation belong to a cluster labeled "seeking behavior" or "pacing behavior"), such as when unsupervised learning is employed.

As an example, the trained machine learning model 225 may predict a value of "Gazing at exit" for the target variable of Guest Behavior for the new observation, as shown by reference number 235. Based on this prediction, response engine 130 may determine whether the guest behavior is a normal guest behavior or an abnormal guest behavior. In other words, response engine 130 may classify the guest behavior as a normal guest behavior or an abnormal guest behavior. Based on determining that the guest behavior is an abnormal guest behavior, response engine 130 may provide a first recommendation, may provide output for determination of a first recommendation, may perform a first automated action, and/or may cause a first automated action to be performed (e.g., by instructing another device to perform the automated action), among other examples. The first recommendation may include, for example, provide assistance to the guest. The first automated action may include, for example, providing a notification to the device of the worker or provide a notification to the device of the operator.

In this way, the behavior detection platform 110 may apply a rigorous and automated process to provide a response to observed actual guest behavior and predicted guest behavior. The machine learning system enables recognition and/or identification of tens, hundreds, thousands, or millions of features and/or feature values for tens, hundreds, thousands, or millions of observations, thereby increasing accuracy and consistency and reducing delay associated with responding to observable events by human operators manually directing response.

As indicated above, FIG. 2 is provided as an example.

Figure 3:
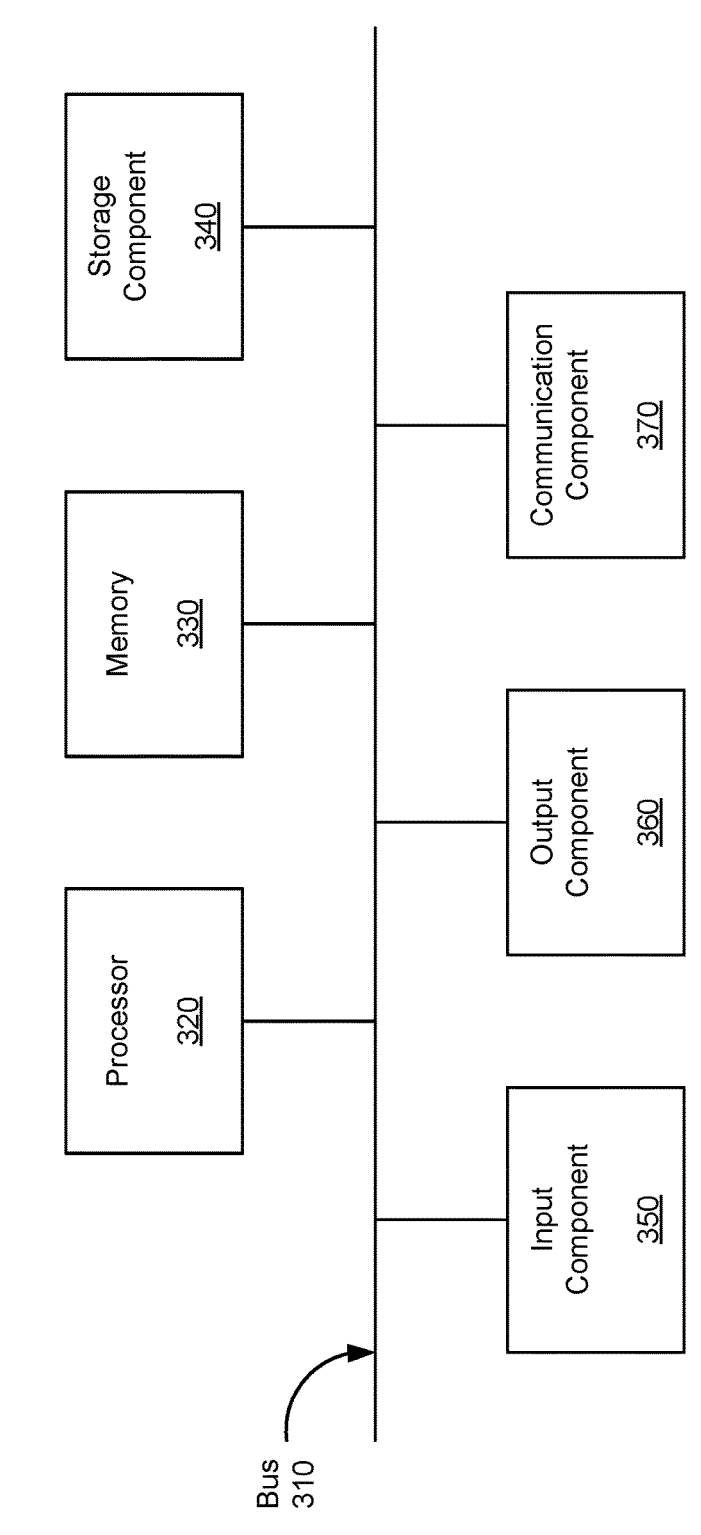
FIG. 3 is a diagram of example components of one or more devices of FIG. 1.

FIG. 3 is a diagram of example components of a device 300, which may correspond to behavior detection platform 110, camera device 105-1, and/or client device 130. In some implementations, behavior detection platform 110, camera device 105-1, and/or client device 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as guest input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with systems and methods for predicting guest behavior. In some implementations, one or more process blocks of FIG. 4 may be performed by a behavior detection platform (e.g., behavior detection platform 110). In some implementations, one or more process blocks of FIG. 4 may be performed by another device or a group of devices separate from or including the prediction platform, such as a camera device (e.g., camera device 105-1) and/or a client device (e.g., client device 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining video data of an environment that includes a guest (block 410). For example, the behavior detection platform may obtain video data of an environment that includes a guest. For example, the behavior detection platform may obtain continuous video/audio streaming or alternatively intermittently stream from one or more camera devices 105.

As further shown in FIG. 4, process 400 may include determining a set of normal guest behaviors associated with the environment (block 420). For example, the behavior detection platform may determine a set of normal guest behaviors associated with the environment. The set of normal guest behaviors may refer to a guest behavior that is typical for the environment (e.g., a guest behavior that typically occurs in the environment or that is expected in the environment). In some implementations, the normal guest behaviors may be based on one or more rules determined for the environment. For example, one rule may indicate that raising one's arms in an expression of joy and excitement is a guest behavior that is part of the set of normal guest behavior associated with the environment.

As further shown in FIG. 4, process 400 may include analyzing the video data, using a first machine learning model, to identify features of the guest (block 430). For example, the behavior detection platform may analyze the video data, using the first machine learning model, to identify the features of the guest.

For example, the first machine learning model may identify a first feature set of environments, a second feature set of edges, a third feature set of blobs, a fourth feature set of corners, a fifth feature set of ridges, a sixth feature set of keypoints, and so on. The features may be represented by values, vectors, or other data structures suitable for the first machine learning model and meet the needs of the application. In some implementations, the features may be identified using one or more techniques, such as an edge detection technique, a primal sketch technique, an edge matching technique, a greyscale matching technique, a gradient matching technique, a pose consistency technique, among other examples. As an alternative, rules, algorithms and/or explicit logic may be used to determine some features either alone or in combination with the first machine learning model.

In some implementations, the video data may be analyzed using a keypoint detection technique to identify a plurality of keypoints of the guest. In examples, the keypoint detection technique may be based on or may include a scale-invariant feature transform algorithm, a speeded up robust features algorithm, a feature from accelerated segment test algorithm, among other examples. In some implementations, analyzing the video data to determine the keypoints comprises using a pose estimation technique to determine at least one of a pose or an orientation of the guest. The at least one of the pose or the orientation may be determined based on the plurality of keypoints identified using the keypoint detection technique.

In some implementations, analyzing the video data and the keypoints to determine the actual guest behavior comprises using an action recognition technique to identify an action performed by the guest. The action recognition technique may include a sensor-based activity recognition technique, a Wi-Fi-based activity recognition technique, a vision-based activity recognition technique, a data-mining-based activity recognition technique, among other examples.

The action may be identified based on the features of the guest. For example, the action may be identified based on the keypoints identified using the keypoint detection technique. The actual guest behavior may be identified based on the action. In some examples, identifying the action may include analyzing data from multiple observations over a period of time.

In some implementations, the video data includes a plurality of frames. Analyzing the video data to determine the actual guest behavior and the keypoints comprises analyzing a first frame, of the plurality of frames, and one or more first keypoints of the keypoints to determine the actual guest behavior. Predicting the predicted guest behavior comprises predicting the predicted guest behavior based on the actual guest behavior, a second frame of the plurality of frames, and one or more second keypoints of the keypoints.

As further shown in FIG. 4, process 400 may include analyzing, using a second machine learning model, the video data and the features to determine an actual guest behavior of the guest (block 440). For example, the behavior detection platform may analyze, using the second machine learning model, the video data and the features to determine the actual guest behavior of the guest For example, in 440 it may be predicted that the actual guest behavior is classified as standing, sitting, jumping, falling, seeking, pacing, singing, shouting or the like.

As further shown in FIG. 4, process 400 may include predicting, using the second machine learning model, a predicted guest behavior of the guest (block 450). For example, the behavior detection platform may predict, using the second machine learning model, a predicted guest behavior of the guest. In some implementations, the predicted guest behavior is predicted based on the actual guest behavior alone or in combination with environmental features.

As further shown in FIG. 4, process 400 may include determining that the predicted guest behavior is not a normal guest behavior in context of the environment (block 460). For example, seeking behavior in an environment featuring an exit may result in a predicted behavior of the guest will in the future try to use the exit. Additionally, or alternatively, the guest suddenly changing their gaze direction to the ground may result in a predicted behavior that the guest will in the future attempt to move or reach to retrieve a dropped item. Additionally, or alternatively, the guest focusing on an object without considering his or her surroundings may result in a predicted behavior that the user will in the future proceed onto a roadway without considering whether a vehicle is approaching the guest.

As further shown in FIG. 4, process 400 may include responding to the guest actual behavior and predicted behavior based on determining that the predicted guest behavior is not normal (block 470). For example, the behavior detection platform may cause assistance to be provided to the guest based on determining that the predicted guest behavior is not included in the set of normal guest behaviors.

In some implementations, the guest is a first guest. Causing assistance to be provided comprises providing a notification to a device of a second guest. The notification indicates that assistance is to be provided to the second guest. Causing assistance to be provided may include activating/deactivating lights, opening doors, removing power from a mechanism, among other examples. In some implementations, the behavior detection platform may implement a decision tree or cyclic graph decision process to select appropriate assistance for a given guest behavior in a given context in a given environment.

In some implementations, process 400 includes training the second machine learning model using training data that includes historical video data regarding historical guest behaviors of guests at the environment. The historical guest behaviors include a first set of guest behaviors performed during a first period of time and a second set of guest behaviors performed during a second period of time that follows the first period of time. For example, the first set of guest behaviors may include the guest seeking an exit and the second set of guest behaviors may include the guest use the exit. As another example, the first set of guest behaviors may include the guest suddenly changing their gaze direction to the ground and the second set of guest behaviors may include the guest attempting to move or reach to retrieve a dropped item. The predicted guest behavior is predicted based on the actual guest behavior, the first set of guest behaviors, and the second set of guest behaviors.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   obtaining, by one or more processors, video data of an environment that includes a person, the video data comprising a plurality of frames;
   determining, by the one or more processors, a set of normal behaviors associated with the environment;
   analyzing, by the one or more processors, with a first machine learning model, the video data to identify keypoints of the person;

analyzing, by the one or more processors, with a second machine learning model, a first frame of the plurality of frames and one or more first keypoints of the keypoints of the person in the first frame to determine an actual behavior of the person;

predicting, by the one or more processors, with the second machine learning model, a predicted behavior of the person, based at least partially on the actual behavior, a second frame of the plurality of frames, and one or more second keypoints of the person in the second frame;

comparing, by the one or more processors, at least one of the actual behavior or the predicted behavior to the set of normal behaviors; and generating, by the one or more processors, a notification.

2. The method of claim 1, wherein:

the person is a first person; and the method further comprises providing, by the one or more processors, the notification to a device of a second person different from the first person.

3. The method of claim 1, wherein the keypoints comprise at least one body part of the person.

4. The method of claim 1, further comprising:

determining, by the one or more processors, with the first machine learning model, at least one of a pose or an orientation of the person.

5. The method of claim 1, wherein determining the actual behavior comprises identifying, by the one or more processors, with the second machine learning model, an action performed by the person.

6. The method of claim 1, further comprising:

training, by the one or more processors, the second machine learning model using training data that includes historical video data comprising historical behaviors of people in the environment.

7. The method of claim 1, further comprising:

analyzing, by the one or more processors, with the first machine learning model, the video data to identify one or more objects;

wherein the one or more processors, predict, with the second machine learning model, the predicted behavior based on the actual behavior, the one or more objects, and the environment.

8. A system, comprising:

one or more cameras; and a behavioral platform comprising one or more processors configured to:

obtain video data from the one or more cameras of an environment that includes a first person and a second person;

analyze, with a first machine learning model, the video data, to identify at least one feature;

analyze, with a second machine learning model using the at least one feature, the video data to determine a first actual behavior of the first person and a second actual behavior of the second person;

predict, with the second machine learning model, a second predicted behavior of the second person based at least partially on the second actual behavior;

determine that the first actual behavior is a first abnormal behavior with respect to a set of normal behaviors of people in the environment;

determine that the second predicted behavior of the second person is a second abnormal behavior with respect to the set of normal behaviors;

provide a notification indicating that assistance is to be provided to at least one of the first person or the second person in response to determining that at least one of the first actual behavior is the first abnormal behavior or the second predicted behavior is the second abnormal behavior.

9. The system of claim 8, wherein the one or more processors are further configured to:

identify the set of normal behaviors out of a plurality of sets of normal behaviors, wherein:

each set of normal behaviors is associated with a respective environment of a plurality of environments, or each set of normal behaviors is associated with one of the one or more cameras.

10. The system of claim 8, wherein the one or more processors are further configured to receive audio data associated with the video data.

11. The system of claim 8, wherein the second machine learning model predicts the second predicted behavior of the second person based on the environment in the video data and the second actual behavior.

12. The system of claim 8, wherein the one or more processors are further configured to determine, with the first machine learning model, at least one of a pose or an orientation of the second person, wherein the second machine learning model determines the second actual behavior based at least partially on the at least one of the pose or the orientation of the second person.

13. The system of claim 8, wherein the one or more processors are further configured to analyze, with the first machine learning model, the video data to identify (i) one or more personal objects in contact with the second person, and (ii) one or more environment objects in the environment, wherein the second machine learning model predicts the second predicted behavior based on the one or more personal objects, the one or more environment objects, the environment, and the second actual behavior.

14. A non-transitory computer-readable medium comprising: one or more instructions that, when executed by one or more processors of a device, cause the device to:

obtain video data of an environment that includes a person;

analyze the video data with a first machine learning model;

determine an actual behavior of the person in response to analyzing the video data;

detect an occurrence of an unexpected event based at least partially on analyzing the video data;

determine that the actual behavior is different from a set of normal behaviors of people in the environment;

predict, with a second machine learning model, a predicted behavior of the person based on at least one of the unexpected event or the actual behavior;

determine that assistance is to be provided to the person based at least partially on determining that the predicted behavior is different from the set of normal behaviors; and cause an action to be performed to provide assistance to the person.

15. The non-transitory computer-readable medium of claim 14, wherein the action comprises generating a notification, the one or more instructions to further cause the device to:

generate the notification to at least one client device to provide assistance to the person, wherein the at least one client device comprises a device of an operator in the environment.

16. The non-transitory computer-readable medium of claim 14, wherein the one or more instructions, to analyze the video data, further cause the device to analyze the video data with the first machine learning model to identify a plurality of keypoints of the person; and wherein the one or more instructions, to determine the actual behavior, further cause the device to determine, with the second machine learning model, the actual behavior based at least partially on the plurality of keypoints of the person.

17. The non-transitory computer-readable medium of claim 14, wherein the one or more instructions further cause the device to:

identify the set of normal behaviors out of a plurality of sets of normal behaviors, wherein:

each set of normal behaviors is associated with a respective environment of a plurality of environments, or each set of normal behaviors is associated with a camera.

\* \* \* \* \*